US008628272B2

(12) United States Patent
Alliot

(10) Patent No.: US 8,628,272 B2
(45) Date of Patent: Jan. 14, 2014

(54) PIPELINE CONNECTION APPARATUS AND METHOD

(75) Inventor: Vincent Alliot, Paris (FR)

(73) Assignee: Acergy France SA, Suresnes (FR)

( * ) Notice: Subject to any disclaimer, the term of this patent is extended or adjusted under 35 U.S.C. 154(b) by 303 days.

(21) Appl. No.: 12/665,603

(22) PCT Filed: Jun. 19, 2008

(86) PCT No.: PCT/IB2008/053484
§ 371 (c)(1),
(2), (4) Date: May 21, 2010

(87) PCT Pub. No.: WO2008/155747
PCT Pub. Date: Dec. 24, 2008

(65) Prior Publication Data
US 2011/0150576 A1    Jun. 23, 2011

(30) Foreign Application Priority Data
Jun. 20, 2007    (GB) .................................. 0711930.8

(51) Int. Cl.
*F16L 1/16*    (2006.01)
(52) U.S. Cl.
USPC ......... 405/170; 405/158; 405/169; 405/184.4
(58) Field of Classification Search
USPC .............. 405/158, 169, 170, 172, 173, 184.4, 405/184.5
See application file for complete search history.

(56) References Cited

U.S. PATENT DOCUMENTS

| | | | |
|---|---|---|---|
| 4,140,292 A * | 2/1979 | Kaigler, Jr. ..................... 248/49 |
| 4,329,086 A | 5/1982 | Rosa et al. | |
| 5,518,340 A | 5/1996 | Hall et al. | |
| 6,004,072 A * | 12/1999 | Cunningham ................ 405/170 |
| 6,312,193 B1 * | 11/2001 | Witting et al. ................ 405/169 |
| 2005/0141967 A1* | 6/2005 | Giles et al. .................... 405/158 |

FOREIGN PATENT DOCUMENTS

| | | | |
|---|---|---|---|
| FR | 2 859 495 A | 3/2005 | |
| FR | 2 871 483 A | 12/2005 | |
| GB | 2338045 A | 9/1998 | |
| WO | WO 2006005994 A1 * | 1/2006 | ............... F16L 1/26 |
| WO | WO2006134456 A1 | 12/2006 | |

* cited by examiner

*Primary Examiner* — Benjamin Fiorello
(74) *Attorney, Agent, or Firm* — Levy & Grandinetti

(57) ABSTRACT

A pipeline alignment termination device comprises a connecting piece (22, 24, 28) connected at its first end to a pipeline (29). The connecting piece is supported on a skid base (12) by an articulated support (24). Adjustable constraints (25, 26, 30, L) operable by ROV, permit the second end (20) to be accurately aligned by transverse and rotational adjustments with the end of a spoolpiece (232, 234). After alignment and connection, constraints on the rotation and transverse movement are removed, leaving the connecting piece supported but free to move with up to five degrees of freedom.

27 Claims, 3 Drawing Sheets

PIPELINE CONNECTION APPARATUS AND METHOD

FIELD & BACKGROUND DISCUSSION

The present invention relates to pipeline connection apparatus, particularly, but not exclusively, pipeline connection apparatus for connecting a pipeline coupling of a first subsea structure, such as a pipeline branch, manifold or termination, to a pipeline coupling of another such structure by way of a spool or jumper arrangement In modern subsea oil and gas exploration and production systems it is common to install a number of subsea structures on the seabed and to connect them together when flow of production between the structures is required. The procedure for connecting a pipeline coupling on one subsea structure to that of another can be complicated since it can be very difficult to position the subsea structures accurately enough on the seabed such that the pipeline coupling of one structure is suitably aligned with that of the other. Another problem encountered is that the pipeline between the structures tends to flex under the effect of temperature and pressure changes which can result in undesirable movement of the structures themselves and the pipeline system as well as increased stress loads.

In an attempt to minimise these problems, it is common to provide a spool or jumper arrangement between the couplings on the structures. The terms 'spool' and 'jumper' are used in this context to refer to a section of pipeline dimensioned to make the connection between a first subsea structure and a second subsea structure. Various terms are in use, and the term 'spoolpiece' will be used herein, without intending any limitation as to the particular form of jumper or spool concerned. The pipe of the spool or jumper in this context is essentially rigid but, by the incorporation of bends, for example, the spoolpiece, provides an important degree of flexibility to absorb relative motion, due to thermal or pressure induced expansion, between the two structures.

Examples of subsea structures connected by a spoolpiece could be a pipeline and riser, a pipeline and fixed subsea structure, or a pair of fixed structures such as a wellhead and manifold. It will be known that a seabed pipeline is generally terminated by some sort of structure to stabilise the pipe and provide some support to the connection with the spoolpiece, and also to provide adequate interface between pipeline/spool and seabed. Such a structure generally is built upon a base structure incorporating a 'mudmat', with the aim to anchor the pipe either totally or partially but generally limit the freedom of the pipe to move in relation to the seabed. This eliminates the uncertainties associated with the soil and its interface with the pipeline.

The spoolpiece thus provides a connection for flow of fluid between the subsea structures which compensates for any misalignment between the respective couplings on the subsea structures. The degree of adjustment, if any, provided by the spoolpiece alone is limited. In situations where the misalignment between the subsea structures is relatively large, it is common that a relatively large and cumbersome spoolpiece must be installed in order to achieve the required connection between the misaligned subsea structures, and/or to provide the required degree of flexibility. Such arrangements also require the spoolpiece to be fabricated with very tight tolerance levels, which can increase costs and complexity.

According to a first aspect of the present invention there is provided a method of making a connection to a subsea pipeline, the method comprising:—

(a) connecting said pipeline to a first end of a pipeline connecting piece having first and second ends;
(b) supporting the pipeline connecting piece on a subsea base structure;
(c) before or after step (b) preparing a second pipeline adapted for connection to the second end of the connecting piece and positioning the second pipeline for connection to the second end of the connecting piece;
(d) applying one or more adjustable constraints to align the second end of the connecting piece with the end of the second pipeline and completing connection of the connecting piece to the second piece of pipeline; and
(e) after completing the connection removing said constraint(s) so that the connecting piece is free to move in at least two dimensions over the subsea base structure.

In the finished installation the connecting piece may be free to move in relation to the base structure with four or five degrees of freedom (for example directions Y, X, ROTX, ROTY, ROTZ) while being supported at a well-defined elevation in a vertical (Z) direction.

The adjusting in step (d) may be performed using one or more actuators acting between the connecting piece and the base structure, the base structure remaining substantially unmoved.

The adjusting in step (d) can include adjusting a roll angle of the connecting piece, including rotation of the attached end of the first pipeline. The rotating action may be provided by a variable length actuator extending between the base structure and a cross bar supporting one side of the connecting piece. Preferably a pair of actuators are provided to effect roll in opposite directions.

The roll actuator(s) may be operable by remote operated vehicle (ROV). This allows a simple screw jack or the like to be provided at low cost, with motive power and control systems being provided on the ROV.

The roll actuator(s) may be removed or retracted in step (e) so as to leave the connecting piece free to roll in response to operating forces in the connected pipelines.

The adjusting in step (d) may include adjusting the pitch angle of the connecting piece by selectively lifting or lowering the first piece of pipeline relative to the seabed.

The adjusting step may include laterally moving the first end of the pipeline connecting piece using suitable transverse actuation means. The transverse actuation means may comprise a pair of hydraulic cylinders provided on either side of the pipeline connecting piece. The transverse actuation means may be removed or otherwise disengaged in step (e), leaving the connecting piece free to translate in response to operating forces in the connecting pipelines.

The connecting piece may be connected on the base structure by an articulated support permitting at least two rotational degrees of freedom (such as roll, pitch and/or yaw).

The base structure preferably includes a skid surface, the connecting piece being supported on a skid foot so as to permit translation in two dimensions parallel to the skid surface and rotation about an axis normal to the skid surface.

The skid foot may be shaped so as to provide at least one of said four or five degrees of freedom by rolling.

The articulated support may include at least one hinge between the connecting piece and the skid foot so as to provide at least one of said four or five degrees of freedom by rotation of the hinge.

Many different structures for the articulated support may be envisaged, depending which degrees of freedom are to be provided by the shape of the skid foot, and which are provided by articulation between the skid foot and the connecting piece. For example, a flat skid foot could be coupled to the connecting piece via a ball joint or universal joint which provides two or three rotational degrees in addition to two translational degrees provided by skidding. At the other extreme a rigid connection may be provided between the connecting piece and the skid foot, the foot having a ball shape so as to permit two rotational degrees of freedom by rolling on the skid surface, and two translational and one rotational degree of freedom by skidding.

In a preferred embodiment described further below, there is provided a skid foot having a part-cylindrical skid surface to provide a first rotational degree of freedom by rolling while providing two translational degrees and a second rotational degree of freedom by skidding. The skid foot in that embodiment is connected to the connecting piece by a pivot joint so as to provide a third rotational degree of freedom.

The second piece of pipeline may be a spool piece connecting the first pipeline via said connecting piece to a fixed seabed structure.

The step (e) may include removing a lateral constraint on the connecting piece such that it may skid freely in two dimensions and yaw over the base structure after installation. This allows the entire pipeline structure to accommodate various operational forces by moving, rather than by resistance in strength and weight or increased spool spans.

The invention in the first aspect further provides a pipeline termination component comprising a pipeline connecting piece joined to at least part of the articulated support for use in the method of the invention as set forth above.

The invention in the first aspect yet further provides a subsea pipeline installation wherein a connecting piece has been deployed by a method as set forth above.

The invention in a second aspect provides a pipeline termination device comprising:—
 a pipeline connecting piece for connecting a first piece of pipeline to a second piece of pipeline;
 an articulated support provided on the pipeline connecting piece for supporting it on a seabed skid base, wherein the articulated support in use allows the pipeline connecting piece orientation to be adjusted relative to the skid base in with least two rotational degrees of freedom in addition to translation by skidding.

The articulated support may include a skid foot so as to permit translation in two dimensions parallel to the skid surface and rotation about an axis normal to the skid surface.

The skid foot may be shaped so as to provide at least one of said rotational degrees of freedom by rolling.

The articulated support may include at least one pivot between the connecting piece and the skid foot so as to provide at least one of said rotational degrees of freedom by rotation about the pivot.

Many different structures for the articulated support may be envisaged, as discussed already above.

In a preferred embodiment, there is provided a skid foot having a part-cylindrical skid surface to provide a first rotational degree of freedom by rolling while providing two translational degrees and a second rotational degree of freedom by skidding. The skid foot in that embodiment is connected to the connecting piece by a pivot joint so as to provide a third rotational degree of freedom.

The connecting piece may be provided with roll arms extending transversely, the apparatus including means for raising at least one of said roll arms selectively in order to alter the roll angle of the pipeline connecting piece relative to the base structure.

One end of the pipeline connecting piece may be connected to a pipeline of a subsea pipeline system and the other end may be connected to a spoolpiece connected to another subsea structure.

The connecting piece may be provided in combination with a skid base adapted for providing a skid surface at a desired location on the seabed.

The skid base may further be provided with a guide gate for guiding the pipeline connecting piece onto the base structure. The or each guide gate may be removable from the base structure, so as to permit transverse movement of the connecting piece after installation.

The combination may be provided with actuation means capable of laterally moving the pipeline connecting piece in order to adjust lateral offset of the pipeline connecting piece relative to the skid base structure. The actuation means may comprise at least one hydraulic cylinder mounted on uprights of the guide gate, where provided.

The apparatus may further comprise means for adjusting a pitch angle of the connecting piece. The pitch adjusting means may be adapted to lift a portion of the subsea pipeline at a suitable distance from the apparatus, the connecting piece pitching about an axis defined by the articulated support.

The invention in the second aspect yet further provides a subsea pipeline installation including a pipeline termination device according to the invention as set forth above.

The invention in a third aspect provides a seabed pipeline installation wherein a pipeline end termination or inline module connected to a first pipeline is supported on a seabed skid base with four or five degrees of freedom of movement relative to the skid base.

BRIEF DESCRIPTION OF THE DRAWINGS

Embodiments of the invention will now be described, by way of example only, with reference to the accompanying drawings, in which.

DETAILED DESCRIPTION OF THE EMBODIMENTS

In offshore oil and gas exploration operations, lengths of pipeline are typically laid on the sea bed using suitable pipeline laying equipment. The pipeline laying equipment is often provided on a reel laying vessel. At the ends of these lengths of pipeline it is common to provide a terminating structure which allows connection of the laid pipeline to the rest of the subsea pipeline system. It is also common to provide in-line structures for various operations. End terminating structures are known as Pipe Line End Terminations (PLETs) and in-line structures are known as In-Line Tees (ILTs). Once installed on the seabed, it is necessary to connect the PLETs/ILTs to other components (manifolds, terminations or another branch of pipeline) of the subsea pipeline system.

As previously described, it can be difficult to install these structures on the sea bed accurately enough to allow connection to one another. Furthermore, once connected, these structures normally only allow a very limited amount of flex in the pipeline connected thereto (typically this is limited to longitudinal movement). Therefore, the pipelines are effectively locked in most directions relative to the PLET/ILT to which they are attached. This means that flexing of the associated pipeline system can physically move the whole PLET or ILT and mudmat along the seabed. This is clearly undesirable since it can cause the mudmat of the PLET or ILT to become embedded in the seabed and cause disruption to the relative positions of the various components in the attached subsea pipeline system. The apparatus described below has an aligning capability which provides an improved alignment process for connection of the structures and allows the attached pipeline system to remain substantially undisturbed due to flexing. The features which provide this capability are provided on a relatively standard PLET base frame. Due to these capabilities the apparatus of FIG. 1 will be referred to as a Pipe Line Alignment Terminal (PLAT), the comments being applicable not only to end terminations but also to inline structures.

Figure 1:
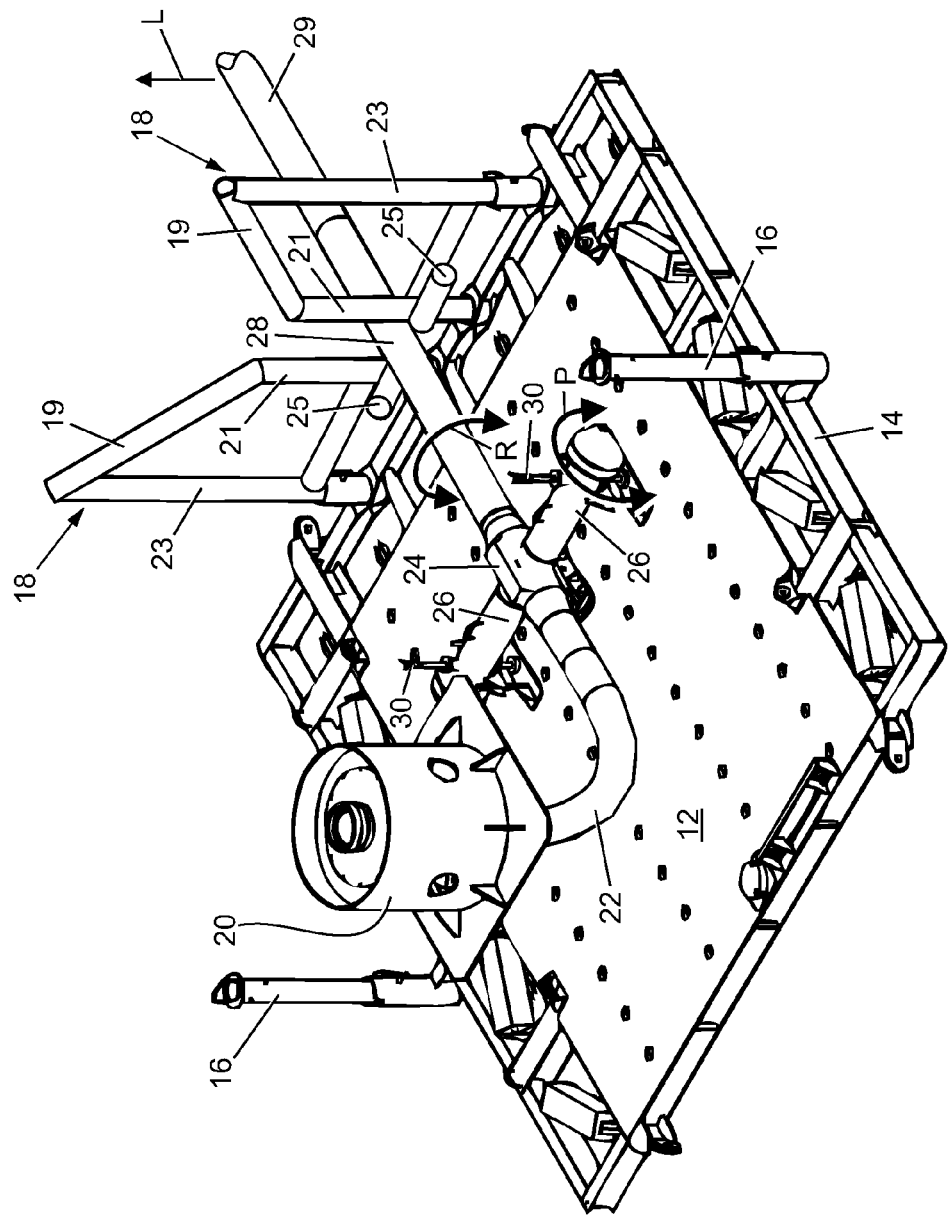
FIG. 1 is a perspective illustration of pipeline connection apparatus according to one embodiment of the present invention.

Referring to FIG. 1, the PLAT apparatus comprises a pipeline termination (referred to in the introduction as a connecting piece) and an associated skid base structure. The base structure includes a skid sheet 12 mounted on top of a mudmat base frame 14. In the embodiment shown, the mud mat base frame 14 has a square shaped footprint and has a pair of guide posts 16 projecting upwards from the mid points of opposite sides of the square. The guide posts 16 are used to anchor the PLAT 10 laterally shortly prior to landing the mudmat 14 on the seabed. Otherwise, the layer of seawater trapped between the seabed and the bottom of the mud mat base frame 14 would escape sideways as the PLAT 10 is lowered into its final position which would cause the PLAT 10 to also move laterally, making it very difficult to position accurately.

At the right hand side of the square mudmat base frame 14 shown in FIG. 1, a pair of pipeline guide gates 18 are provided. These gates sit in receptacles incorporated to the base structure and are secured by means of ROV locking pins. When the spool/jumper connection is completed these guiding gates can be removed just by removing the locking pin and lifting them off with a winch or a crane from the surface. Each of the guide gates 18 comprises a pair of upright posts 21 (inner) and 23 (outer) which are joined to one another at their upper ends by an inclined cross bar 19. The inclined cross bars 19 are inclined towards one another in order to create a V-shaped pipeline guide.

The gate structure includes receptacles for a pair of hydraulic cylinders 25 to be are fixed to each of the inner upright posts 21. These actuators can be used to effect limited sideways movement of pipe between the gates 18, by reacting against the fixed inner upright posts 21. These actuators 25 may not be deployed if manufactured pieces fit well enough the situation on the ground. They can be held in reserve and mounted and operated by an ROV in case of need.

The pipeline termination and connecting piece, in the embodiment shown in FIG. 1, comprises a hub 20, curved pipe section 22, and straight extension pipe 28. This assembly rests on the upper surface of the skid sheet 12 by way of articulated support 24 and roll arms 26. It can be seen from FIG. 1 that the straight extension pipe 28 is connected to the main length of pipeline 29. As in the case of a conventional PLET, the pipe 28 has been welded to the end of the pipeline and laid down from the surface at the end (or start) or the pipe laying operation.

The hub 20 is a relatively standard, drum-shaped hub coupling for making a fluid connection to the pipeline 29 at some later time via a mating coupling part. An example of a conduit which may connect to the hub 20 is a jumper/spool arrangement connected to a coupling of a riser, manifold, or PLET, for example.

In the embodiment shown in FIG. 1, the curved pipe section 22 and the straight extension section 28 are arranged to provide a pipeline connecting piece which presents the hub 20 for coupling to a spool pipe at right angles to the axis of pipeline 29. However, it will be appreciated that any other angle of connection could be provided, primarily by providing a different degree of curve in the curved pipe section 22. Indeed, the curved extension section 22 could be straight in order to provide an in-line connection between the first and second subsea structures.

Figure 2:
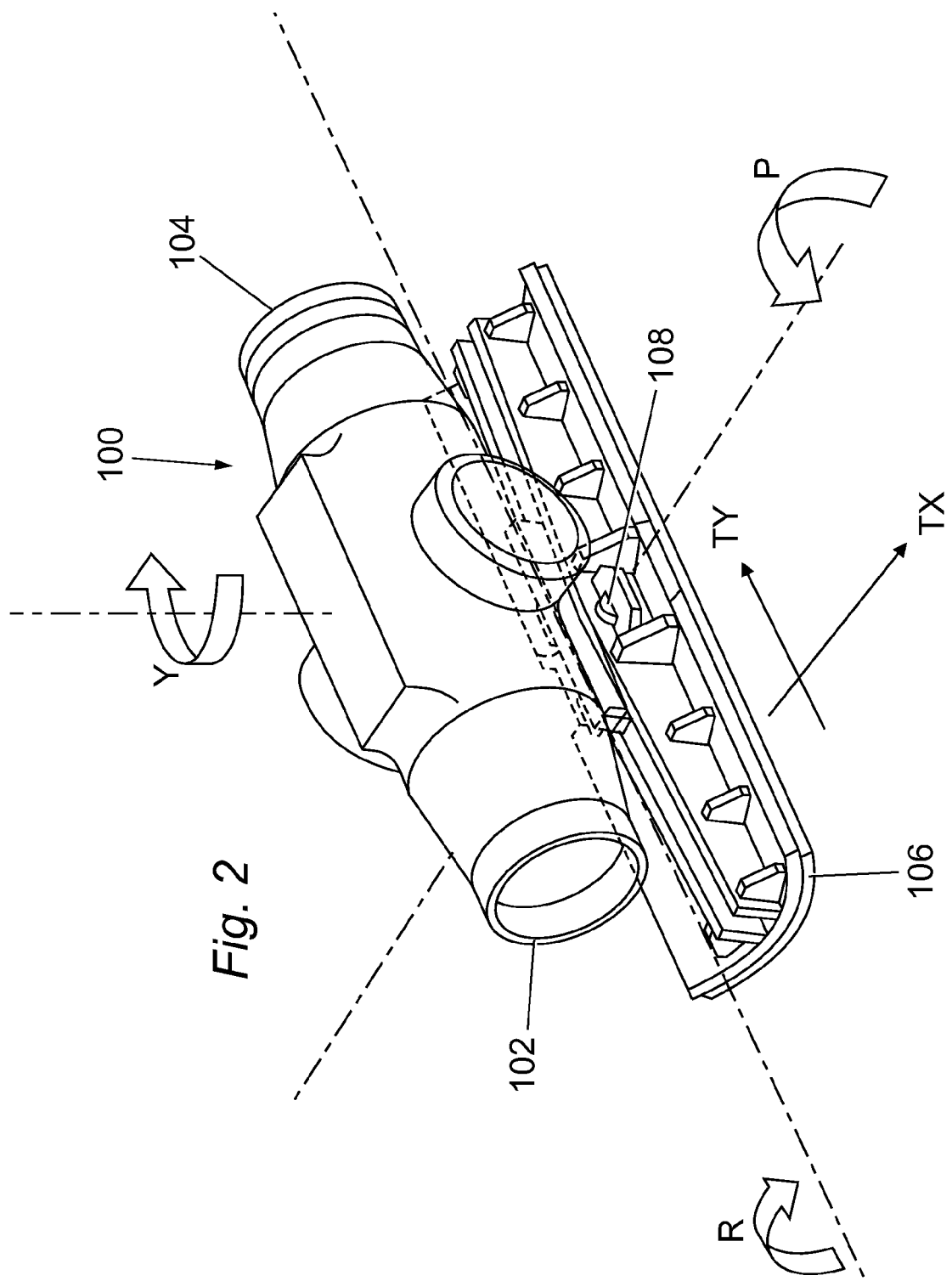
FIG. 2 is a more detailed view of an articulated support in the apparatus of FIG. 1.

FIG. 2 shows in more detail the form of the articulated support 24 which supports the connecting piece 22/28 on the base structure. In the embodiment shown, support 24 is based around a forged body 100. This has a through bore and chamfered ends 102, 104 to be welded to the pipes 22, 28 respectively to form the complete connecting piece. The connecting piece could alternatively be forged from one piece of pipe with a sleeve clamped or welded to it to form the articulated support body.

Body 100 is connected to a skid foot 106 which in this embodiment is curved in one dimension to form a part cylinder parallel to the pipeline axis. This form of skid foot permits the whole assembly to roll about an axis, as indicated by arrow R. The roll axis may be somewhat lower than the pipeline axis, as shown. This is a matter of design choice, and depends on the radius of curvature of the foot relative to the height of the pipeline axis. Body 100 is connected to foot 106 via a pivot joint 108 which permits rotation of the body about a pitch axis, as indicated by arrow P. Finally, by skidding of skid foot 106 on skid sheet 12, the support body is able to translate in two dimensions TX, TY, and rotate in a yaw direction, indicated by arrow Y. Thus the body 100 and connecting piece as a unit can be made free to rotate and translated with up to five degrees of freedom, while being supported at a well defined height above the seabed.

During the installation phase, these degrees of freedom are deliberately constrained to permit the hub 20 to be presented in a known position and orientation for connection to spoolpiece or other structure. However, the constraints can be made adjustable, so that the position and orientation can be matched even in non-ideal conditions. With regard to the roll movement, support body 100 has a pair of roll arms 26 projecting transversely from its side walls. Support body 100 is provided at each side with sockets for the roll arms 26. The arms 26 may be journalled to rotate in the body, depending on the structure of the roll jacking arrangements and the degree of pitch to be accommodated. Each roll arm 26 has a jacking device operated either mechanically or hydraulically by one or more Remotely Operated Vehicles (ROV, not shown). The ROV can independently raise or lower the ends of the roll arms 26 relative to the skid sheet 12, by activating the jack devices in opposite directions to adjust the roll angle R. In the example illustrated, the jacking devices are operated by rotating handles 30 which drive simple helical screws. Each jacking device has its own small skid foot. The roll arms or at least the roll jacking devices are made removable, so that the constraint on the roll axis can be removed after installation.

The gates and the roll arms 26 can be provided with releasable locking devices which allow them to be releasably fixed to the skid sheet 12. This may be useful if the base structure and connecting piece are to be handled as a unit during laying. When the locking devices are released, however, the pipeline connecting piece and hub 20 is free to skid over the skid sheet 12 in each direction in the plane of the skid sheet 12.

Figure 3:
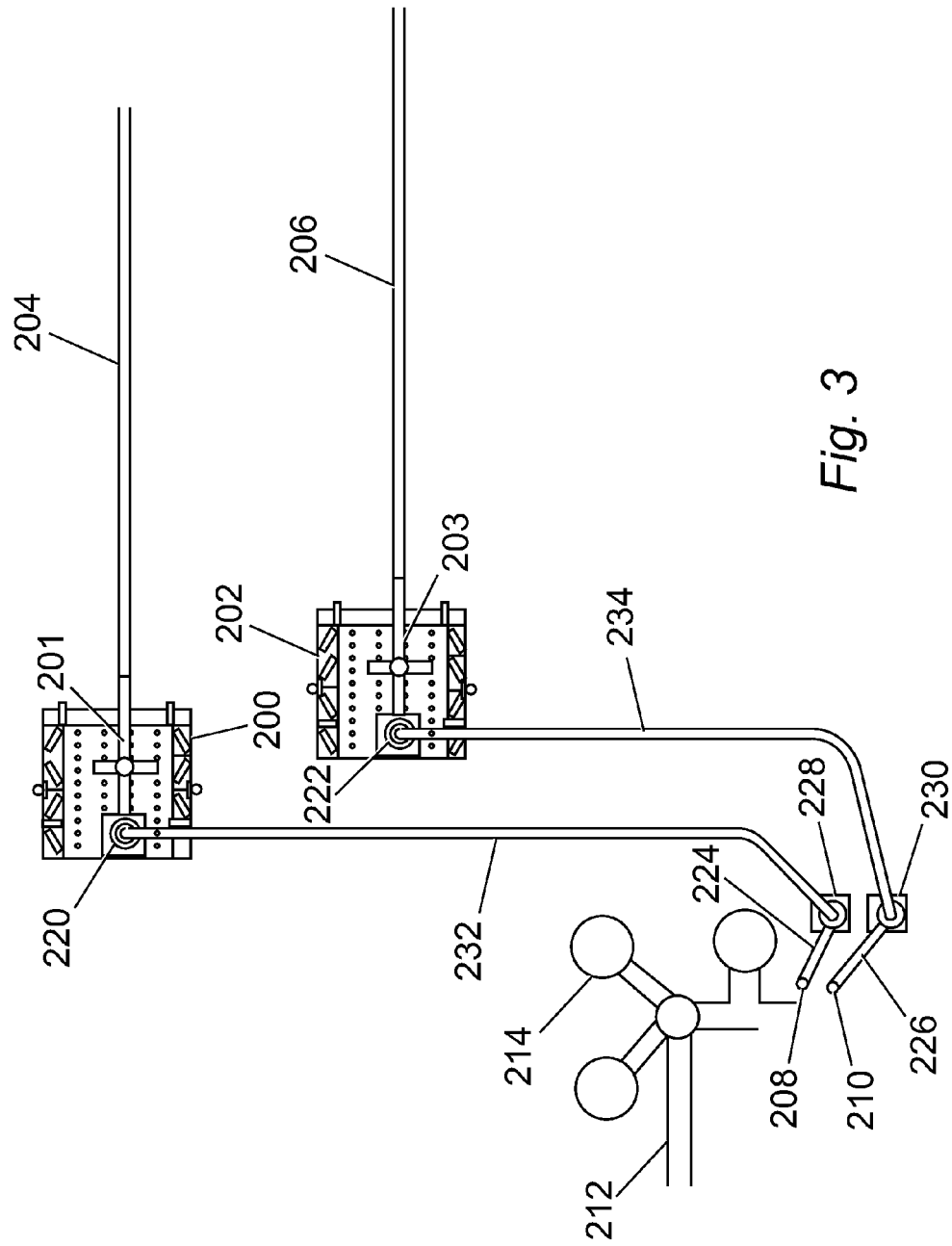
FIG. 3 is a plan view of a completed installation including two such apparatuses.

FIG. 3 shows in plan view a typical installation using bases 200, 202 to carry PLATs 201, 203 which in turn connect two seabed flowlines 204, 206 to respective riser conduits 208, 210. The risers are vertical conduits supported in a riser tower or catenary riser structure which includes riser base 212 anchored by piles 214 driven into the seabed soil. In the same way as the PLATs 201, 203 provide connecting pieces with upward-facing hubs 220, 222 for making connections to their respective flowlines 204, 206, each riser 208, 210 is provided with a U-shaped connecting piece 224, 226 terminating at an upward-facing connection hub 228, 230. A first spool piece 232 with complementary connectors is dimensioned to fit between hub 220 and hub 228 to connect flowline 204 to riser 208. A second spool piece 234 with complementary connectors is dimensioned to fit between hub 222 and hub 230 to connect flowline 206 to riser 210.

Each flowline, termination, spool piece and riser will normally have the same inner diameter, although the different lines 204, 206 may have different diameters according to the flow volumes and properties of fluid for which they are designed.

Bearing in mind that the spool pieces each have three bends between vertical and horizontal or inclined segments, it will be appreciated that they provide a degree of flexibility to absorb stresses caused by movements between the flowline and the riser structure in operation. For the purposes of the installation process, however, the spool pieces are essentially rigid structures designed and built to fit as exactly as possible between the hubs 220/222 and 228/230. In a conventional installation, this rigidity imposes strict constraints on the accuracy of measurement and design of the spool pieces. These constraints are relaxed by the novel PLAT structures and design and installation procedures used in the present example. Moreover, the strength, size and weight of the spoolpieces can be relaxed as the PLATs provide a more compliant termination for the pipeline than a conventional PLET fixed to a mudmat or fixed in all but one degree of freedom.

An example installation method will now be described, with reference for example to the first flowline 204 of FIG. 2, as well as the more detailed description of the PLAT and base apparatus given above with reference to FIG. 1.

In the preferred embodiment, the PLAT 10 and base structure 12, 14 are handled and installed separately, perhaps from different vessels on different days. The base is first installed accurately on the seabed in a known manner. The PLAT 10 and pipeline 29/204 are welded together on the installation vessel, then deployed by lowering onto the mudmat. Gates 18 assist in positioning the PLAT centrally on the base. The PLAT is then in contact with the base through articulated support 24 and stabilisation arms 26 with jacking devices pre-set on surface to provide adequate stability to the PLAT and ensure a vertical position of the hub 20. The pipe 28-29 is secured by the system of actuators 25 of the guiding gates, or other locking devices if the actuators 25 are not deployed.

Then we proceed with metrology between hubs of the pipeline 20/220 and riser 228. A suitable spoolpiece 232 is fabricated on shore with the result of the metrology. The spool piece is transported offshore, lifted with the installation vessel, deployed subsea and placed to join the male riser and pipeline hubs.

The connecting hubs 220, 222, 228, 230 in this example are the male parts of a remotely operated type of connector which can be provisionally engaged first of all, and subsequently made permanent by ROV intervention. The spool pieces 232, 234 are provided at their ends will corresponding female parts. It is envisaged that both ends of the spool piece will be presented and at least the riser end of the spool piece provisionally engaged with the connector hub 228. Ideally, at the other end of the spool piece, the female part of the connector will be positioned exactly to mate with the PLAT hub 220, and the connections can be completed. If the positioning of the PLAT 10 relative to the end of the spoolpiece is not sufficiently close in position and/or orientation to allow connection to the hub 20, then the position of the hub 20 relative to the spoolpiece can be altered using the special features of the PLAT as follows.

The directions in which the hub 20 must be moved in order to arrive at an orientation in which it can connect to the spoolpiece are determined. Two inclinometers mounted on the pipeline hub and on the jumper give the relative misalignment between the two hubs, which is corrected by use of activators 30 or lifting the pipe 29. The lateral offset between hubs is measured by ROV. From these measurements can be derived translation, roll, pitch and yaw co-ordinates for the desired adjustment.

The roll angle of the hub 20 is manipulated, if necessary, by raising and lowering opposite roll arms 26. This may be done using a suitable tool of an ROV in order to wind the jacking handles 30 to lift/lower the arms 26 to a suitable height from the skid sheet 12. This causes the roll arms 26 to rotate on the curved skid foot 106 in the direction R. Geometric calculations used in this process will take into account that the movements of the PLAT are not independent. For example, in the embodiment shown roll and translation are connected because the roll axis is not coincident with the pipeline axis or the hub position;

The pitch angle of the hub 20 is manipulated by lifting the portion of pipeline 29, as shown by arrow L in FIG. 1. The point of lift should be at an adequate distance from the PLAT, typically between 15 and 30 metres. The lifting means are not shown but may for example be an adjustable buoyancy device tethered to the pipe by a cable. This causes not only tilting but also lowering of the hub, because, in the example shown the hub is spaced away from the pitch axis and on the side remote from the pipe 29.

Lateral offset can be manipulated using the hydraulic cylinders 25 to move the straight extension portion 28 from side to side, which in turn causes the hub 20 to translate from side to side.

Yaw angle in the direction Y can in practice be adjusted by raising one or other of the roll arms 26. This generates a degree of torsion in the straight section of pipeline 28, 29, which in turn will cause the connecting piece and hub 20 to yaw to the desired orientation;

All of the above adjustments can be made while the base 12, 14 remains unmoved. This obviously relaxes the accuracy required in placement of the mudmat compared with conventional PLETs, ILTSs etc. which are rigidly connected to their supporting base.

The alignment capability of the PLAT 10 also results in a reduced level of accuracy being required in the fabrication and metrology tolerances of the spool piece and the connected components of the subsea pipeline system. Since it is not easy to raise the hub in this embodiment, The spoolpiece may be manufactured with tolerances biased to the lower side, so that any error falls within the one-sided range of adjustment. Similarly, a one-sided roll adjustment could be envisaged, with manufacturing tolerances in the roll angle similarly biased to one side.

Once the PLAT 10 has been connected at both ends of the pipeline connecting piece, active alignment of the pipeline connecting piece and hub 20 is no longer required and the jacking feet of roll arms 26 and jacking means of the articulated support 24 can be released from lateral restraint relative to the skid sheet 12. The guide gates 18 (comprising the cross bars 19, inner uprights 21, outer uprights 23 and, optionally, hydraulic cylinders 25) can also be removed from the mudmat base frame 14 and retrieved to the surface or alternatively re-located to another PLAT.

The only connection remaining between the pipeline connecting piece and the skid sheet 12 is then the combination of the (elevated) articulated socket support 24 and skid foot 106. This results in the pipeline connecting piece being free to slide around the surface of the skid sheet 12 in response to any movement or deformation of the subsea pipeline system to which it is connected. The pipeline can therefore also rotate around the PLAT's central axis. This decoupling of the pipeline connecting piece and the skid sheet 12 results in a much lighter PLAT structure and /spool arrangement being required to cope with the operating loads, since the pipeline connecting piece essentially slides over its base in response to the operating loads, rather than resisting them or trying to move the base itself.

Clearly, one effect of the PLAT 10 is that it raises a length of the pipeline behind the PLAT 10 off the seabed. This creates a free span of pipeline behind the PLAT 10 which is not restrained laterally by any interaction with the seabed. This unsupported section of pipeline is therefore able to deflect under pipeline expansion and contraction which increases the overall flexibility of the structure thereby allowing a further reduction in overall size and weight of the /spool/jumper required.

The PLAT 10 provides an adaptable interface between the subsea pipeline system (including the /spool arrangement) and the seabed. This has the great advantage of preserving the subsea pipeline system and associated structure integrity. Furthermore, it provides a connecting piece which has far more degrees of freedom of movement than known PLETs and similar structures. Known PLET's provide at most only one degree of freedom (longitudinal) and lock or restrain movement in the other directions. In some cases known PLETs and their mudmats are designed to move relative to the seabed; however, this causes high frictional loads and soil disturbance which makes the PLET movement difficult to predict. For example, there is an increased risk of the PLET embedding itself in the mud of the seabed. This is a particular problem in installations subject to repeated pipeline expansion/contraction cycles.

Modifications and improvements may be made to the foregoing without departing from the spirit and scope of the invention, for example:—

Rather than having a single drum-shaped connection hub 20 at one end of the pipeline connecting piece and a straight extension section 28 at the other, either a straight or curved extension could be provided at both ends of the pipeline connecting piece and/or a drum-shaped connection hub 20 could be provided at both ends of the respective pipeline connecting piece depending upon the particular application desired. Connecting may be by traditional bolted flange joints or by a variety of stabbing and semi-automated and ROV-operated couplings.

The connecting piece of the PLAT in the above examples is welded or otherwise attached to the end of pipeline 29 at the surface, and then lowered to the seabed. The PLAT base (mudmat and guide structures) may be laid with the PLAT as one unit, while the two are temporarily locked together. Alternatively, as described above, the base may be pre-installed on the seabed to receive the PLAT connecting piece lowered with the pipeline.

Furthermore, although the apparatus described is installed as an end termination, minimal modification would be required in order to allow it to be used in other applications such as an In-Line Tee, or on a mud mat for a subsea valve module or the like. In the case of an ILT, for example, the termination piece becomes a Tee piece.

While the transverse actuators 25 mentioned above are said to be deployed by ROV only as needed, they could of course be permanent fixtures of the gate structures 18. The gate structures and actuators together can be recovered to the surface for re-use after installation of the spoolpiece.

The invention claimed is:

1. A method of making a connection between a first pipeline and a second pipeline, the method comprising:
    (a) before laying the first pipeline, connecting said first pipeline to a first end of a pipeline connecting piece having first and second ends;
    (b) during laying of the first pipeline, supporting the pipeline connecting piece on a subsea base structure;
    (c) before or after step (b) preparing the second pipeline adapted for connection to the second end of the connecting piece and positioning an end of the second pipeline for connection to the second end of the connecting piece;
    (d) applying one or more adjustable constraints to align the second end of the connecting piece with the end of the second pipeline and completing connection of the connecting piece to the second piece of pipeline to limit at least one degree of freedom; and
    (e) after completing the connection of the connecting piece to the second piece of pipeline, removing said one or more adjustable constraints so that the connecting piece is free to move with at least four degrees of freedom relative to the subsea base structure.

2. The method according to claim 1, wherein the step of removing the one or more constraints includes allowing the connecting piece to move in relation to the base structure with four or five degrees of freedom while being supported at a predetermined elevation relative to the base structure.

3. The method according to claim 1, wherein the step (d) includes adjusting said one or more constraints by provision of one or more actuators between the connecting piece and the base structure, the base structure remaining substantially unmoved.

4. The method according to claim 3, wherein step (e) includes removing the one or more actuators so as to leave the connecting piece free to roll in response to operating forces in the connected pipelines.

5. The method according to claim 1, wherein step (d) further includes the step of rotating the connecting piece in order to adjust a roll angle of the connecting piece, including rotation of the attached end of the first pipeline.

6. The method according to claim 5, wherein a rotating action is provided by at least one variable length actuator extending between the base structure and a cross bar supporting one side of the connecting piece.

7. The method according to claim 6, including operating the at least one variable length actuator by way of a remote operated vehicle (ROV).

8. The method according to claim 1, wherein the step (d) further includes the step of adjusting a pitch angle of the connecting piece by selectively lifting or lowering the first piece of pipeline relative to the seabed.

9. The method according to claim 1, wherein the step (d) further includes the step of laterally moving the first end of the pipeline connecting piece using at least one hydraulic cylinder.

10. The method according to claim 9, wherein step (e) includes selectively removing the at least one hydraulic cylinder, leaving the connecting piece free to translate in response to operating forces in the connected first and second pipelines.

11. The method according to claim 1, wherein after step (e) the connecting piece is left supported on the base structure on an articulated support permitting at least two rotational degrees of freedom.

12. The method according to claim 1, wherein a skid surface is provided on the base structure, the connecting piece being supported on a skid foot so as to permit translation in two dimensions parallel to the skid surface and rotation about an axis normal to the skid surface.

13. The method according to claim 12, wherein a part-cylindrical skid surface is provided on the skid foot to provide a first rotational degree of freedom by rolling while providing two translational degrees and a second rotational degree of freedom by skidding.

14. The method according to claim 13, wherein the skid foot is connected to the connecting piece by a pivot joint so as to provide a third rotational degree of freedom.

15. The method according to claim 1, wherein the second pipeline is a spool piece connecting the first pipeline via said connecting piece to a fixed seabed structure.

16. A pipeline termination device comprising:
   a pipeline connecting piece for connecting a first piece of pipeline to a second piece of pipeline, wherein the pipeline connecting piece is adapted for connection with releasable, adjustable constraints to the first piece of pipeline before it is laid and is adapted for connection to the second piece of pipeline after laying of the first piece of pipeline;
   an articulated support provided on the pipeline connecting piece for supporting it on a seabed skid base, wherein the articulated support in use allows the pipeline connecting piece orientation to be adjusted relative to the skid base with at least two rotational degrees of freedom in addition to translation by skidding.

17. The pipeline termination device according to claim 16, wherein the articulated support includes a skid foot having a part-cylindrical skid surface to provide a first rotational degree of freedom by rolling while providing two translational degrees and a second rotational degree of freedom by skidding.

18. The pipeline termination device according to claim 17, wherein the skid foot is connected to the pipeline connecting piece by a pivot joint so as to provide a third rotational degree of freedom.

19. The pipeline termination device according to claim 16, wherein the pipeline connecting piece is provided with roll arms extending transversely from the pipeline connecting piece.

20. The pipeline termination device according to claim 19, further comprising at least one actuator for raising at least one of said roll arms selectively in order to alter a roll angle of the pipeline connecting piece relative to the seabed skid base.

21. A combination of a pipeline termination device and a skid base, the combination providing:
   a pipeline termination device comprising a pipeline connecting piece for connecting with a releasable, adjustable constraint a first piece of pipeline to a second piece of pipeline and an articulated support; and
   the skid base adapted for providing a skid surface at a desired location on the seabed,
   wherein the pipeline connecting piece is adapted for connection to the first piece of pipeline before it is laid and is adapted for connection to the second piece of pipeline after laying of the first piece of pipeline, and wherein the articulated support supports the pipeline connecting piece on the skid base installed on the seabed, wherein the articulated support in use allows the pipeline connecting piece orientation to be adjusted relative to the skid base with at least two rotational degrees of freedom in addition to translation by skidding.

22. The combination according to claim 21, wherein the skid base is further provided with a guide gate for guiding the pipeline connecting piece onto the skid base.

23. The combination according to claim 22, wherein the guide gate is selectively removable from the skid base, so as to permit transverse movement of the pipeline connecting piece after installation.

24. The combination according to claim 22, further comprising at least one actuator capable of laterally moving the pipeline connecting piece in order to adjust lateral offset of the pipeline connecting piece relative to the skid base.

25. The combination according to claim 24, wherein the actuator comprises at least one hydraulic cylinder mounted on uprights of the guide gate.

26. The combination according to claim 21, further comprising a lifting device for adjusting a pitch angle of the connecting piece, wherein the lifting device is adapted to lift a portion of the subsea pipeline at a suitable distance from the apparatus, the pipeline connecting piece pitching about an axis defined by the articulated support.

27. The subsea pipeline installation comprising a spool piece connected to a subsea pipeline at a pipeline termination device supported on a skid base, wherein:
   the pipeline termination device comprises a pipeline connecting piece connecting with a releasable, adjustable constraint the spool piece to the subsea pipeline and an articulated support;
   the articulated support supports the pipeline connecting piece on the skid base installed on the sea bed, the skid base providing a skid surface; and
   wherein the articulated support in use allows the pipeline connecting piece orientation to be adjusted relative to the skid base with four degrees of freedom relative to the skid base including at least two rotational degrees of freedom in addition to translation by skidding.

* * * * *